(12) United States Patent
Campbell et al.

(10) Patent No.: US 6,521,196 B2
(45) Date of Patent: Feb. 18, 2003

(54) PROCESS AND CATALYST/SORBER FOR TREATING SULFUR COMPOUND CONTAINING EFFLUENT

(75) Inventors: Larry E. Campbell, Knoxville, TN (US); Gregory J. Wagner, Knoxville, TN (US)

(73) Assignee: EmeraChem, LLC, Knoxville, TN (US)

( * ) Notice: Subject to any disclaimer, the term of this patent is extended or adjusted under 35 U.S.C. 154(b) by 0 days.

(21) Appl. No.: 09/825,915

(22) Filed: Apr. 4, 2001

(65) Prior Publication Data

US 2001/0016184 A1 Aug. 23, 2001

Related U.S. Application Data

(60) Continuation of application No. 09/496,092, filed on Feb. 1, 2000, now abandoned, which is a division of application No. 09/113,258, filed on Jul. 10, 1998, now Pat. No. 6,037,307.

(51) Int. Cl.[7] .............................................. B01D 53/50
(52) U.S. Cl. ............................. 423/242.1; 423/244.01; 423/244.09; 423/244.1; 423/539; 423/564
(58) Field of Search .................... 423/242.1, 244.01, 423/244.09, 244.1, 539, 564; 502/527.19

(56) References Cited

U.S. PATENT DOCUMENTS

| | | | | |
|---|---|---|---|---|
| 4,399,112 A | * | 8/1983 | Voirin ........................ | 423/230 |
| 4,521,530 A | * | 6/1985 | Zackay et al. .............. | 502/218 |
| 4,977,129 A | * | 12/1990 | Ernest ........................ | 502/330 |
| 5,061,464 A | * | 10/1991 | Cordonna, Jr. et al. .. | 423/213.5 |
| 5,128,305 A | * | 7/1992 | Yoshimoto et al. ......... | 502/243 |
| 5,665,321 A | * | 9/1997 | Campbell et al. ........... | 423/210 |
| 5,670,444 A | * | 9/1997 | Yoshida et al. ............. | 502/331 |
| 5,792,436 A | * | 8/1998 | Feeley et al. ................ | 423/210 |
| 5,883,037 A | * | 3/1999 | Chopin et al. .............. | 502/308 |
| 5,939,220 A | * | 8/1999 | Gunner et al. ................ | 429/40 |
| 6,037,307 A | * | 3/2000 | Campbell et al. ........... | 502/325 |

FOREIGN PATENT DOCUMENTS

| | | | |
|---|---|---|---|
| DE | 27 54 393 A1 | * | 6/1978 |
| GB | 2082162 A | * | 3/1982 |
| JP | 63-264137 A | * | 11/1988 |
| WO | WO 97/43034 A | * | 11/1997 |

OTHER PUBLICATIONS

Kohl et al. *Gas Purification* 4th Ed. Gulf Publishing. Co. Houston Tx; ISBN 0–87201–314–6; pp. 396–397, 1985.*

* cited by examiner

*Primary Examiner*—Stanley S. Silverman
*Assistant Examiner*—Timothy C. Vanoy
(74) *Attorney, Agent, or Firm*—Pitts and Brittian, P.C.

(57) ABSTRACT

A process for adjusting the ratio of sulfur dioxide to hydrogen disulfide from the regeneration of a catalytic system of a structured support for example a monolith coated with: (i) a metal oxide sorber component selected from the group consisting of Ti, Zr, Hf, Ce, Al, Si and mixtures thereof, for example $Ti_2O$, (ii) a precious metal component, for example Pt metal and, optionally (iii) a modifier consisting of an oxide Ag, Cu, Bi, Sb, Sn, As, In, Pb, Au or mixtures thereof, such as Cu as copper oxide. The system first captures the gaseous sulfur compounds. Then the captured gaseous sulfur compounds are then desorbed as mainly $H_2S$ and SO, in higher concentrations in a separate isolated lower flow stream in a ratio determined by the amount of modifier in the catalyst. The higher concentrations may be processed to less noxious or useful sulfur materials and the catalyst/sorber is regenerated.

11 Claims, 8 Drawing Sheets

PROCESS AND CATALYST/SORBER FOR TREATING SULFUR COMPOUND CONTAINING EFFLUENT

This is a continuation of application Ser. No. 09/496,092 filed Feb. 1, 2000, now abandoned, which is a division of Ser. No. 09/113,258 filed Jul. 10, 1998 now U.S. Pat. No. 6,037,307.

BACKGROUND OF THE INVENTION

1. Field of the Invention

The present invention relates to removing gaseous sulfur compounds from gaseous streams, particularly the removal of $SO_2$ and $H_2S$ from combustion and industrial process effluents, by using a regenerable catalyst/sorber.

2. Related Art

As one result of concern with air pollution, environmental regulators have severely reduced and are continuing to reduce allowable emissions of sulfur oxides and hydrogen sulfide. As a result, a variety of technologies have been developed and are continuing to be developed for use in flue gas desulfurization (FGD).

FGD techniques can generally be classified as wet and dry scrubbing. Dry scrubbing contacts the effluent with a solid material which chemically reacts with the sulfur component and forms a compound. The system can be a fixed bed such as zinc oxide pellets that are used to react with $H_2S$ to form zinc sulfide. The zinc sulfide pellets must be removed and replaced after saturation. The dry scrubber can also be in powder or particulate injected into the stream followed by a baghouse or electrostatic filtration to remove the reacted product. An example of powder would be limestone, which would react after injection into the exhaust stream to form calcium sulfate and/or calcium sulfite hemihydrate sludge. The material is typically delivered as a wet slurry, which dries in the exhaust and reacts with the sulfur oxides. This material is then removed and typically disposed of in a landfill. There are also regenerable dry scrubber materials such as copper oxide on aluminum oxide pellets or spheres. The regenerable copper systems must be heated to and or reduced at high temperatures. This technique requires that the sorption temperature be less than the regeneration temperature.

Wet scrubbing techniques use wet slurries or amine solutions and require that the exhaust temperature be reduced to below the boiling point of the solutions to be used. These techniques give rise to losses by evaporation and entrainment and produce products which are contaminated and unusable and must be disposed of/or purified before reuse.

The present invention introduces a new technology for the removal of $H_2S$, $SO_2$ and oxidation of CO. This technology utilizes a catalytic oxidative sorption process for the removal of the sulfur component where the sulfur component is first oxidized and preconcentrated and then released in a concentrated stream of much smaller volume which is delivered to processes for recovery as sulfur, sulfur dioxide, or sulfuric acid. This technology has tremendous advantages over the scrubbing techniques. It is an advantage that the present process operates in the exhaust stream with oxidative capture mode and reductive regeneration occurring at the same temperature. It is a further advantage that it is a dry process, which is selective for sulfur components and will produce sulfur oxide off gases with high concentration and purity. It is a feature of the present invention that it reduces the volume of sulfur containing gases thereby reducing the costs for further processing. It is a further feature that the process also operates over a wide range of temperatures (200° F. to 800° F.). It is another advantage of the process of the present invention that it has high capture efficiencies of over 99.75% and also has very low pressure drop.

SUMMARY OF THE INVENTION

One aspect of the present invention is a process for removing gaseous sulfur compounds, particularly $SO_2$ and/or $H_2S$ from gaseous streams, such as effluent combustion and industrial process streams, comprising contacting a gaseous stream, containing gaseous sulfur compounds with a catalyst/sorber under sulfur sorbing condition, said catalyst/sorber comprising a noble metal catalyst component, a metal oxide sorber component, and optionally modifiers consisting of oxides of Ag, Cu, Bi, Sb, Sn, As, In, Pb, Au or mixtures thereof to remove said gaseous sulfur compound from said stream to said catalyst/sorber. In a preferred embodiment of the present process the gaseous sulfur compound containing stream is terminated and the sorbed sulfur is desorbed from said catalyst/sorber by contacting the catalyst/sorber with a regenerating gas stream under sulfur compound desorbing conditions whereby the catalyst/sorber is regenerated for reuse in the sorbing. A most preferred embodiment comprises alternating said sorbing and regeneration steps.

Preferred regenerating gases provide a reducing environment. The reducing agents include hydrogen and hydrocarbons or mixtures thereof. The hydrocarbon preferably comprises of $C_1$–$C_{12}$ hydrocarbons, which may be used as one compound or mixtures of compounds. Usually the reducing agent will comprise methane and/or a mixture of hydrocarbons. The principal source of methane is natural gas. The principal component of the gaseous stream is an inert carrier gas such as nitrogen, helium, argon or steam. The term "principal component" is used to mean over 50%. The regeneration may also be carried out with the inert carried gases alone or with oxygen present. Air may also be used for regeneration.

Another aspect of the present invention is the catalyst/sorber. The noble metal component may comprise Pt, Pd, Rh, Ru or mixtures thereof, preferably Pt. The metal oxide sorber component is an oxide of Ti, Zr, Hf, Ce, Al, Si or mixtures thereof. In addition to these components, the catalyst/sorber optionally contains a modifier comprising an oxide of Ag, Cu, Bi, Sb, Sn, As In, Pb, Au or mixtures thereof, preferably Cu, Ag, Bi and mixtures thereof. The purpose of the modifier is to inhibit the formation of $H_2S$ during regeneration.

The catalyst/sorber can be used in pellet, spheres, particulate, or extruded form. Preferably the catalyst/sorber can be coated onto a carrier with the catalyst/sorber comprising 1 to 50 wt % of the total weight. The noble metal component is preferably present as from 0.005 to 20.0 wt % of the catalyst/sorber, the sorber component is preferably present as from 70 to 99 wt % of the catalyst/sorber, and the modifier is preferably present as from 1 to 10 wt % of the catalyst/sorber.

Although the sulfur compounds are removed from a gaseous stream on and/or onto the catalyst/sorber according to the present invention, it is not known in what form or by what mechanism the sulfur is associated with the catalyst/sorber. It is the invention that the sulfur compounds in the gaseous stream are in some manner releasably associated with the catalyst/sorber in an oxidizing atmosphere. It is believed that the sulfur is associated with the catalyst/sorber as a compound, most likely as an oxide, but not in the elemental form. Elemental sulfur has not been observed. Preferably the sulfur is removed from the catalyst/sorber as a more concentrated stream of sulfur compounds. Unless otherwise stated percentages and ratios of compounds expressed herein are by weight.

PREFERRED EMBODIMENTS

Figure 1:
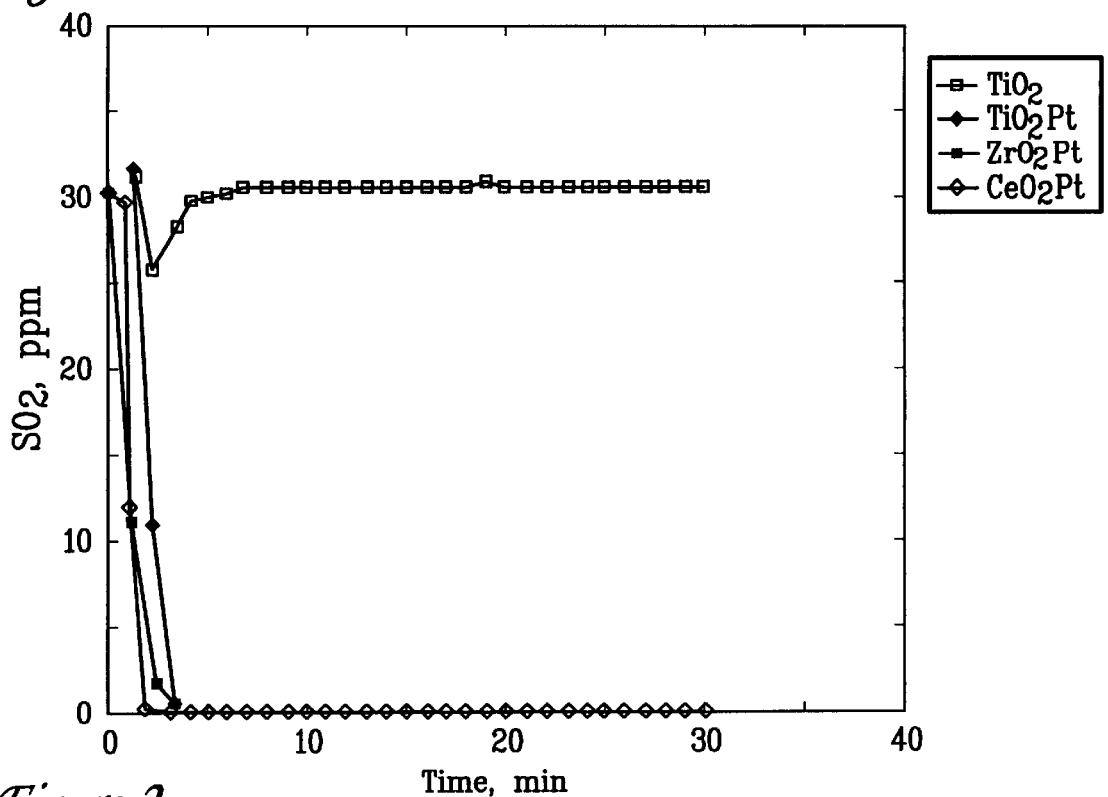
FIG. 1 shows outlet $SO_2$ values during 300° F.—30 minute sorption runs with 30 ppm $SO_2$ and the conditions given in Table 2 with different catalyst/sorber compositions.

The sorption stage may be carried out at 100 to 1000° F., preferably 300 to 600° F. at GHSV 200 to 200,000 $hr^{-1}$ preferably 1,000 to 120,000 $hr^{-1}$. The pressures may range from subatmospheric to 500 psig.

The desorption stage may be carried out at 100 to 1000° F., preferably 300 to 900° F. at GHSV 20 to 20,000 $hr^{-1}$, preferably 50 to 10,000 $hr^{-1}$. The pressures may range from subatmospheric to 500 psig.

By carrying out the present sorption/desorption the sulfur compounds in the feed may be concentrated from 5 to 100 times.

If a carrier is utilized, the carrier may be characterized as ceramic or metal monolith having a honeycomb structure. Preferably a carrier is used to distribute the catalyst/sorber and any modifier. The components are deposited onto the carrier in the proportions desired. The composition of the ceramic carrier can be any oxide or combination of oxides. Suitable oxide carriers include the oxides of Al, Zr, Ca, Mg, Hf, Ti, and various mixtures of the oxides, such as cordierite and mullite.

The structure and composition of the carrier is of great importance. The structure of the carrier affects the flow patterns through the catalyst/sorber system which in turn affect the transport to and from the catalyst surface. The ability of the structure to effectively transport the compounds to be catalyzed to the catalyst surface influences the effectiveness of the catalyst/sorber. The carrier is preferably macroporous with 64 to 600 cells (pores) per square inch (cpsi) which is about 25 to 80 pores per linear inch (ppi), although carriers having 5 to 90 ppi are suitable The catalyst/sorber may be conditioned by repeated sorption/desorption cycling. The amount of sulfur components released during this conditioning increases with each regeneration until it equals the amount sorbed. It was found that by pretreating the catalyst/sorber with dilute $H_2SO_4$, that the conditioning time was dramatically reduced. For example, instead of 12 hours, conditioning after $H_2SO_4$ treatment only required several hours at 300° F. The conditioning time was also found to be dependent on the temperature at which the sorption and regenerations were conducted. By increasing the temperature one can increase the amount released, hence, decreasing the conditioning time. A special conditioning may not be necessary, since the catalyst/sorber will become conditioned after several cycles of sorption/regeneration and remain so thereafter.

The amount of $SO_2$ capable of being consumed by the catalyst/sorber will be referred to as the capacity of the catalyst/sorber. From a short capacity study it was concluded:

1. When the sorption/desorption temperature increases, the capacity increases.
2. When the catalyst/sorber loading is increased, the capacity increases.
3. When the noble metal content in the catalyst/sorber is increased, the capacity increases.

The catalyst/sorber used during this study was coated onto a ceramic honeycomb carrier. The catalyst/sorber/carrier contained 3.48 grams/$in^3$ $TiO_2$/Pt with a platinum content of 0.5%. The capacity of this sample was determined to be 20 cc $SO_2$/$in^3$. This value was determined with an $SO_2$ breakthrough less than 10%, hence, 20 cc is a minimum value.

Experimental data gave a $SO_2$/Pt mole ratio of 10 during catalyst/sorber saturation. One theory which is not intended to reduce the scope of the present invention is that this large excess of sorbed $SO_2$ suggests that the role of the platinum is not of a sorber. The platinum under this theory promotes the sorption of $SO_2$ through the catalytic oxidation of $SO_2$ and the sulfur subsequently sorbs onto the conditioned $TiO_2$/Pt surface.

The capacity of a $TiO_2$/Pt/Cu system was examined in a manner similar to that conducted with the $TiO_2$/Pt system. The results were almost identical. The conclusions were:

1. When the sorption/desorption temperature increases, the capacity increases.
2. When the $TiO_2$/Pt loading is increased, the capacity increases.
3. When the platinum content in the $TiO_2$/Pt is increased, the capacity increases. The copper modifier had little effect on sorber capacity.

According to the present invention sulfur can be captured and released by the catalyst/sorber, for example, a $TiO_2$/Pt system at temperatures as low as 300° F., however, the desorbed components released during regeneration consisted mainly of a mixture of $H_2S$ and $SO_2$. The ratio of $H_2S/SO_2$ depended on residence time and/or the presence of modifiers. In some applications the $H_2S$ would not be desirable; hence it would be preferably to release the sulfur components as $SO_2$.

The nature of the desorbed sulfur components can be changed by adding a modifier to the catalyst/sorber. A variety of modifiers have been utilized but to date the most efficient have been copper, silver and bismuth. It was found that the addition of modifiers to the catalyst sorber increased the release of sulfur as $SO_2$ and diminish or inhibit the formation of $H_2S$. The modifiers may be deposited directly onto the catalyst/sorber or deposited within. A variety of modifies were determined to work; however, the most efficient were found to be copper, bismuth, and silver.

Figure 9:
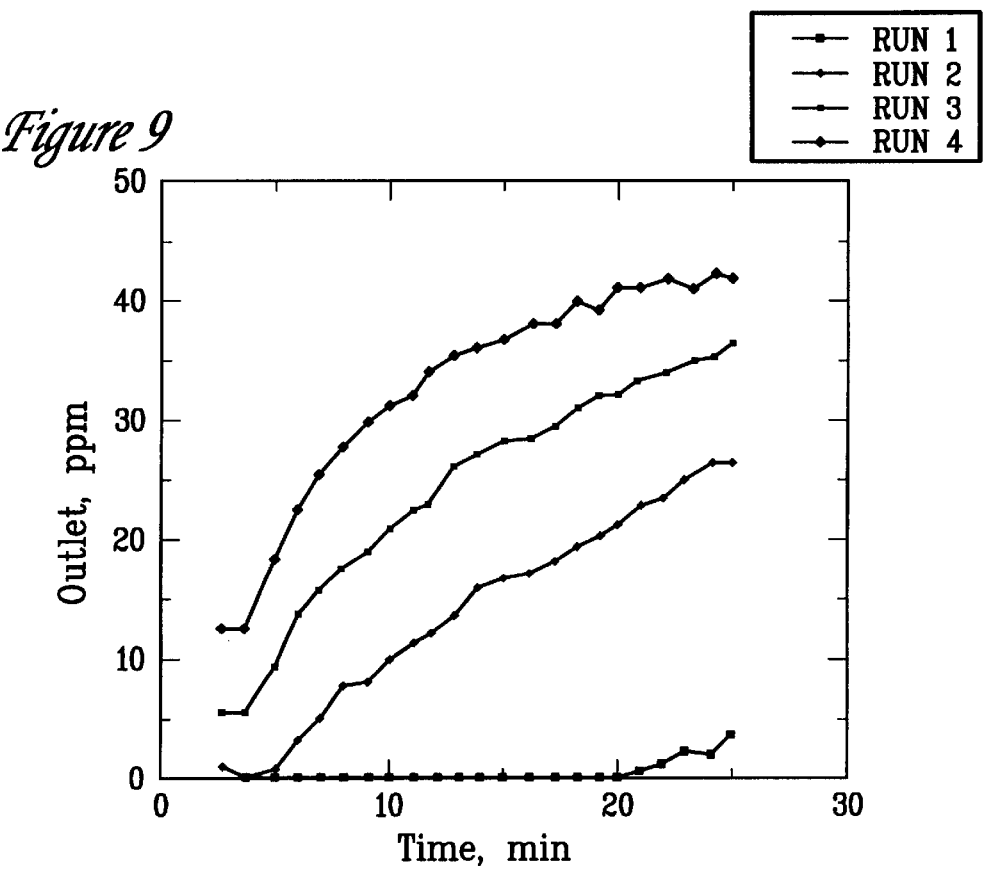
FIG. 9 shows consecutive 60 ppm $SO_2$ cycles with $TiO_2$/Cu sorber/modifier with no noble metal catalyst component at 500° F.

Modifiers were also examined without a noble metal, e.g., Pt, i.e., sorber only in the washcoat, for example $TiO_2$/Cu. Although many were examined and found to capture the sulfur, the release of the $SO_2$ or $H_2S$ during regenerations was not accomplished and the sorbers soon became saturated. This is illustrated in FIG. 9 where consecutive 60 ppm $SO_2$ sorption cycles were carried out with a $TiO_2$/Cu sample. Intermediate regenerations followed each sorption cycle. The results show decreasing removal efficiency with each run.

Figure 5:
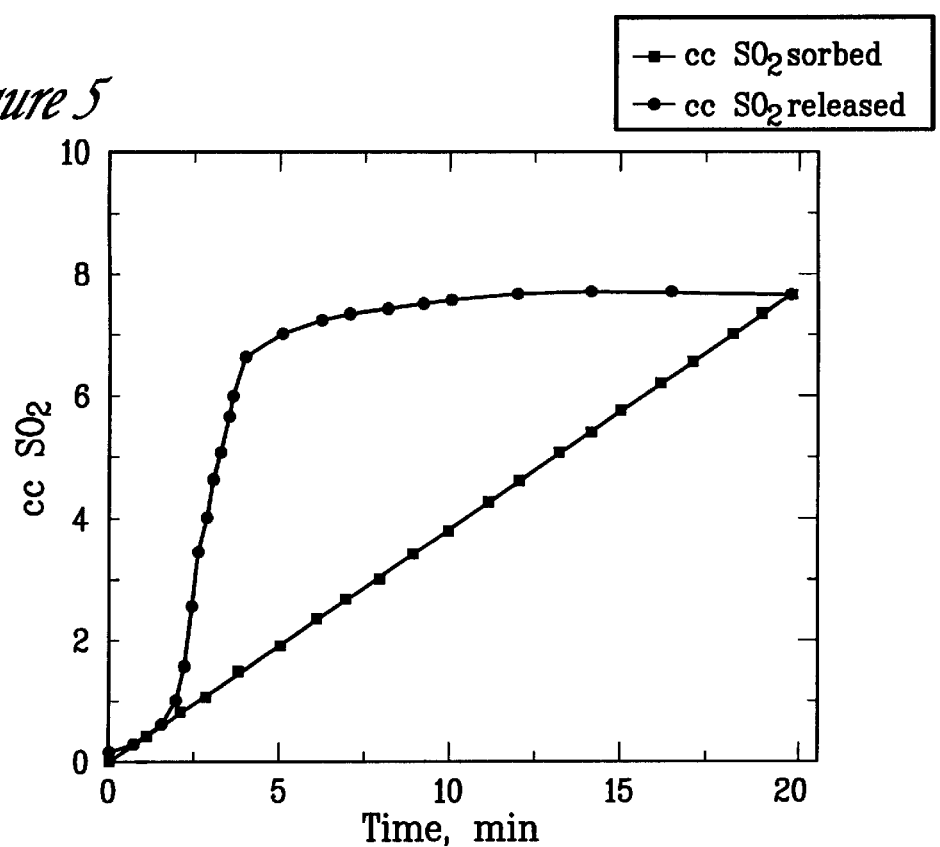
FIG. 5 shows the amount of $SO_2$ captured and released during a 20 minute run and a subsequent regeneration of the $TiO_2$/Pt/Cu catalyst/sorber at 500° F.

By adding the modifier, e.g., Cu to the catalyst/sorber, the $SO_2$ captured during the sorption cycles was found to be released during the standard regeneration cycles. This is illustrated in FIG. 5 where both the sorption and desorption cycles reached 7.7 cc $SO_2$. The sulfur released during the regeneration was $SO_2$. No $H_2S$ was detected during this regeneration.

Figure 6:
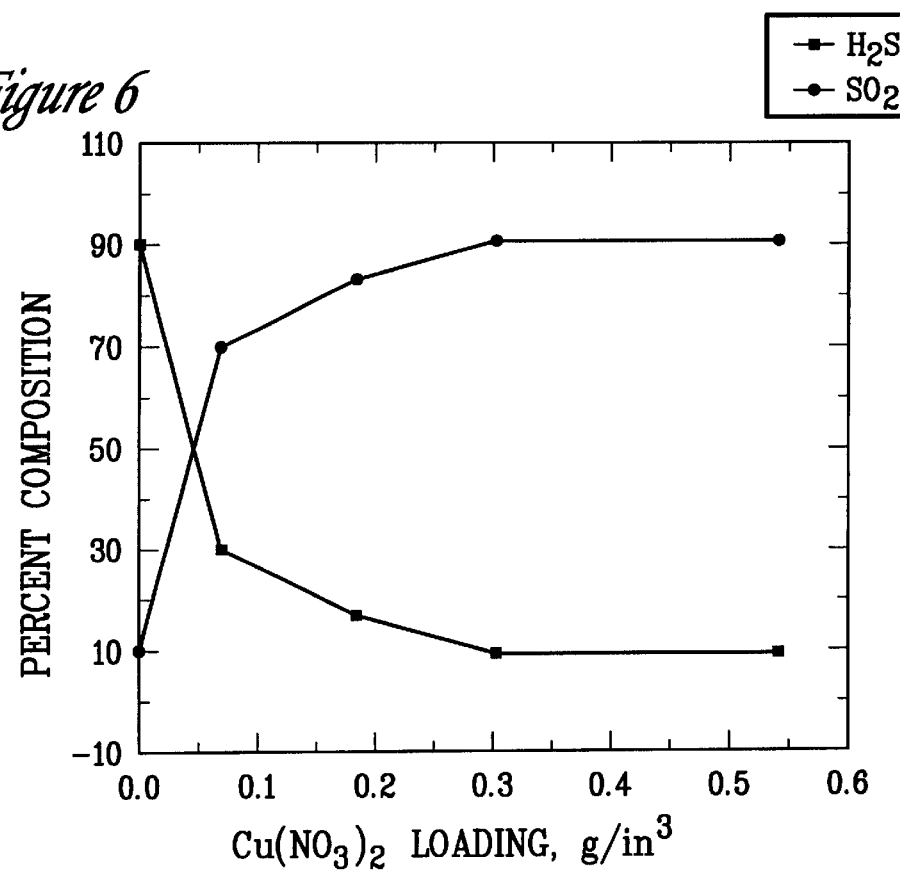
FIG. 6 shows the effect of Cu loading reported as precursor $Cu(NO_3)_2$ on the proportion of $H_2S$ and $SO_2$ released during 500° F. regenerations (Table 4) with the $TiO_2$/Pt/Cu system.

The $Cu(NO_3)_3$ precursor loading on the catalyst/sorber used in FIG. 5 was 0.3 g/in$^3$. FIG. 6 illustrates the effect of the $Cu(NO_3)_3$ loading on the proportion of sulfur released as $SO_2$ and $H_2S$. This figure demonstrates that in the vicinity of 0.3 g/in$^3$ and greater, all the sulfur compounds released during the regenerations was released as $SO_2$; however, below 0.3 g/in$^3$ $H_2S$ is released and the amount of $H_2S$ released increases with decreasing $Cu(NO_3)_3$ loading. This effect was also observed with the other $TiO_2$/Pt/X (where X is the metal modifier as defined) modifiers such as the bismuth and silver. The ability to change the $H_2S/SO_2$ ratio with modifier loading is a tremendous asset of this new technology. The ability to adsorb sulfur from a dilute stream and then release it in a concentrated stream with appropriate $H_2S/SO_2$ ratio for use in the Claus process has not been heretofore disclosed. FIG. 6 clearly illustrates that the $Cu(NO_3)_2$ loading can be used for this purpose.

Figure 12:
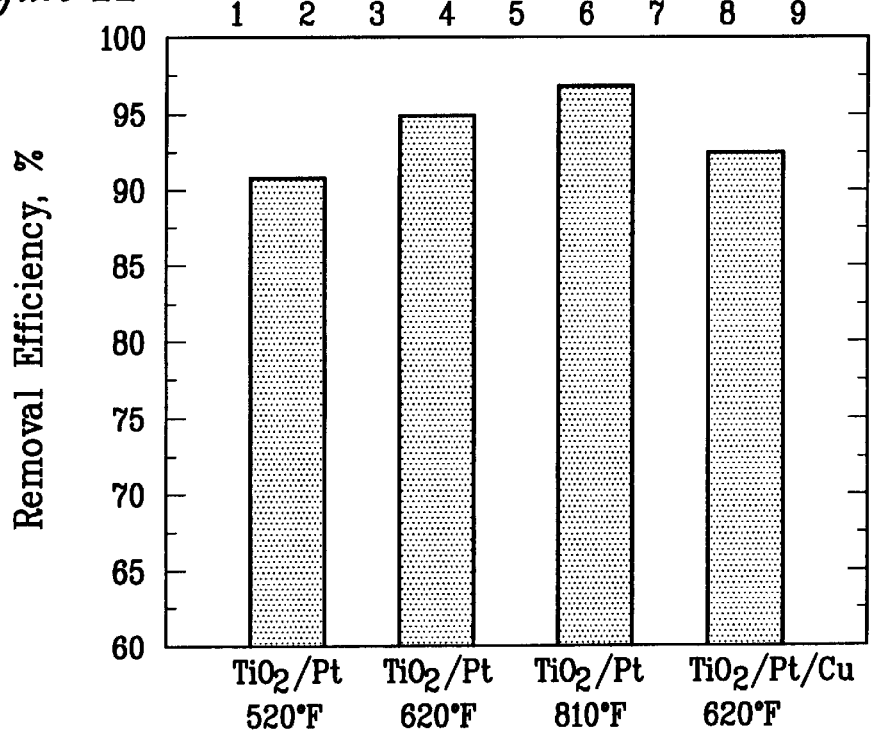
FIG. 12 shows capture efficiencies obtained during 75 minute 60 ppm sorption cycles with the $TiO_2$/Pt system at 520, 620, and 810° F. and comparatively the $TiO_2$/Pt/Cu system at 620° F.

FIG. 12 shows the $SO_2$ removal efficiency of the $TiO_2$/Pt system at various temperatures and the removal efficiency of the $TiO_2$/Pt/Cu system at 620° F. From this figure, it is evident that the capacity of the $TiO_2$/Pt system increases with temperature. The role of the copper and other modifiers appears to reside only in changing the regeneration of the catalyst to diminish $H_2S$ formation.

By increasing the $SO_2$ inlet concentration or lengthening the sorption time, the $TiO_2$/Pt catalyst/sorber will eventually become saturated; hence, producing $SO_2$ breakthrough. This is illustrated in FIG. 2 where both a 500 ppm and a 60 ppm sorption run were conducted for 10 minutes.

Figure 2:
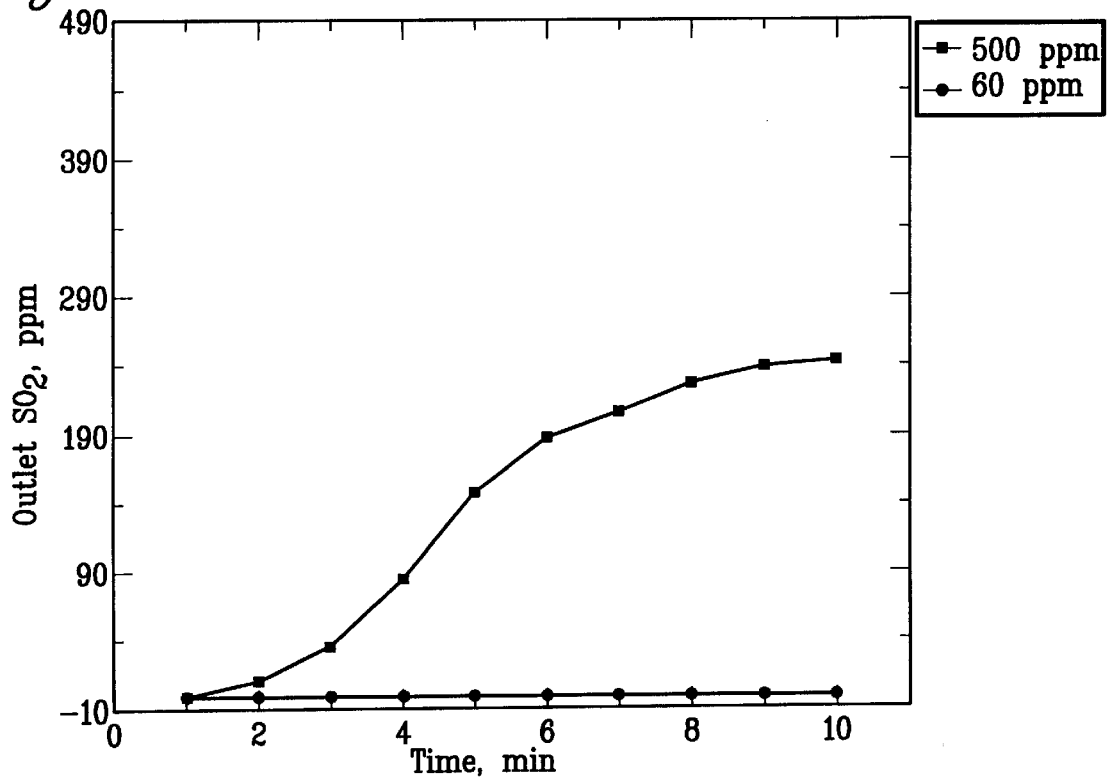
FIG. 2 shows outlet $SO_2$ values during a 500 ppm $SO_2$ sorption run and a 60 ppm $SO_2$ sorption run at 500° F.

FIG. 2 shows that there is no evidence of $SO_2$ breakthrough during the 60 ppm run. The 500 ppm run, in contrast, does show breakthrough. During this sorption run, the $SO_2$ breakthrough is relatively low (<40 ppm) for the first 3 minutes, however, after 3 minutes the $SO_2$ breakthrough increases dramatically. This breakthrough results when the majority of sorption sites have been consumed.

EXAMPLES

The catalyst/sorbers used in the examples were prepared on 200-cell-per-square-inch cordierite square-cell honeycomb. The $TiO_2$/Pt washcoat was prepared by incipient wetness. Pt content ranged from 0.1 to 2.2%. After drying and calcining at 500° C., the solids were then dispersed in 7% acetic acid and ball milled overnight. The ceramic honeycombs were then dipped into the slurry of washcoat/Pt, removed, blown off, and then dried at 150° C.

The $TiO_2$/Pt/X samples were prepared by immersing the $TiO_2$/Pt honeycomb sample into a modifier solution. The sample was then removed, blown off, and finally dried at 150° C. The catalyst/sorbers had a nominal composition as shown in Table 1.

TABLE 1

| Catalyst/sorber Composition (except as otherwise noted): | |
|---|---|
| $TiO_2$ | 0.4–3.5 g/in$^3$ |
| Pt | 0–.08 g/in$^3$ |
| X | 0–0.3 g/in$^3$ |

For testing, the samples were placed into a 304 stainless steel tubular reactor and placed inside a three-zone furnace. The reactor was connected to a gas delivery system which delivered mixed gases simulating a gas turbine exhaust. The gases were measured and controlled by Matheson mass flow transducers. Water was injected into a preheat furnace using a Cole Palmer instrument number 74900 precision syringe pump. Unless stated otherwise, the test gas compositions are given in Table 2. All sorption runs were conducted with a space velocity of 30,000 hr$^{-1}$.

TABLE 2

| Test Gas Compositions | |
|---|---|
| Gas Component | Concentration |
| $SO_2$ | 30–500 ppm |
| $O_2$ | 14–52% |
| $CO_2$ | 3.05% |
| $H_2O$ | 10.20% |
| $N_2$ | Balance |

Before passing processed gas through the analytical instruments, the water was removed with a chiller. The dried exhaust was then analyzed with the instruments shown in Table 3. To measure $H_2S$, the exhaust was first directed through a $H_2S$ to $SO_2$ converter. This converter consisted of a heated (900° F.) stainless steel tube. During regenerations, oxygen was added to the exhaust before entering the converter. Laboratory tests with calibration gas showed virtually 100% $H_2S$ conversion to $SO_2$. During some experiments the $H_2S$ was measured with a BOVAR model 922 analyzer.

TABLE 3

Analytical Instruments Used During Testing

| Gas Constituent | Instrument |
| --- | --- |
| SO2 | BOVAR model 721-M |
| CO | TECO model 48 |
| NO,NO2 | TECO model 10S |
| NH3 | TECO model 300/10S |
| CO2 | Horiba model DIA 510 |
| H$_2$S | BOVAR model 922 |

Standard regeneration cycles were conducted with the gas composition given in table 4 at a space velocity of 2000 hr$^{-1}$.

TABLE 4

Regeneration Gas Composition

| Gas Component | Concentration |
| --- | --- |
| CO | 0.02% |
| CO$_2$ | 1.00% |
| N$_2$ | 57.14% |
| H$_2$O | 40.84% |
| H$_2$ | 4.00% |

Catalyst Preparation

The catalyst for the following examples was prepared as follows:

Ceramic honeycomb carrier.

Sorber component of 2.2 g/in$^3$.

Platinum loading from 0.25 to 1.1 wt % of the sorber component.

Metal modifier prepared with the metal nitrate precursor (0.00 to 0.30 g/in$^3$).

Example 1

Example 1 shows 30 minute, 30 ppm SO$_2$ sorption runs with the TiO$_2$, TiO$_2$/Pt, ZrO$_2$/Pt and CeO$_2$/Pt systems at 300° F. With the TiO$_2$ sample there is little SO$_2$ capture, however, the TiO$_2$/Pt, ZrO$_2$/Pt, and CeO$_2$/Pt catalyst/sorbers gave significant SO$_2$ captured as shown in FIG. 1. This illustrates the effectiveness of the Ti, Zr, and Ce and the importance of the noble metal component. TiO$_2$ loading 2.18g/in$^3$; XO$_2$/Pt loading 2.18 g/in$^3$; 1.1% Pt where X=Ti, Zr, or Ce.

Example 2

Example 2 illustrates the effect of inlet SO$_2$ concentration (60 ppm vs 500 ppm) during 10 minute, 500° F. sorption runs with a TiO$_2$/Pt catalyst/sorber (2.18 g/in$^3$; 0.5% Pt). FIG. 2 shows SO$_2$ breakthrough with the higher (500 ppm) SO$_2$ inlet. This breakthrough results when the catalyst/sorber becomes saturated. After or during saturation, the catalyst/sorber can be revitalized with a reducing gas or a thermal desorption.

Example 3

Figure 3:
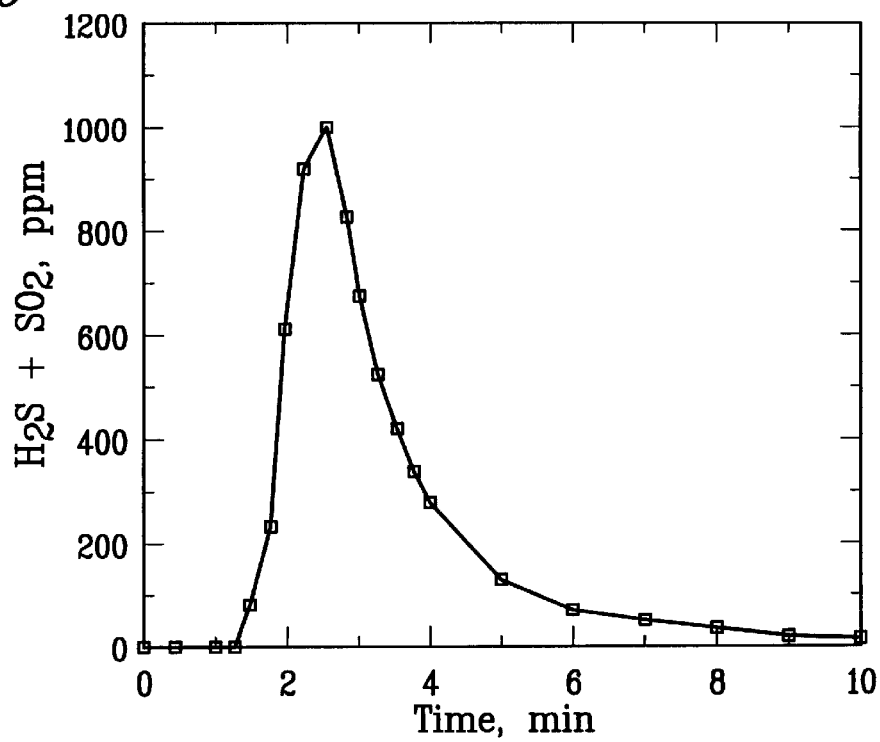
FIG. 3 shows sulfur components released during regeneration of partially saturated $TiO_2$/Pt catalyst/sorber.

Example 3 shows the regeneration of a partially saturated TiO$_2$/Pt catalyst/sorber at 500° F. Regeneration of the catalyst/sorber revitalizes the sorber and produces a concentrated stream of sulfur compounds with the primary compound being H$_2$S. The regeneration cycle was about 10 minutes as shown in FIG. 3.

Example 4

Figure 4:
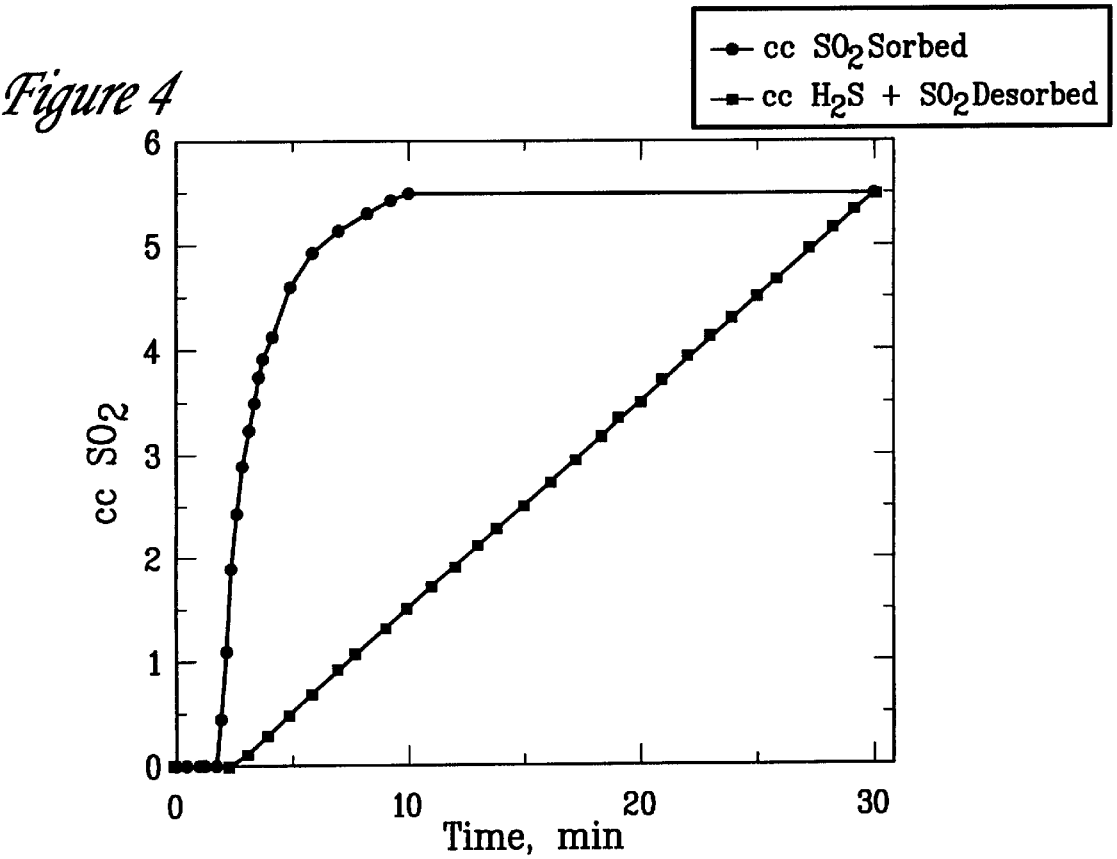
FIG. 4 shows the amount of $SO_2$ captured and released during a 20 minute run and a subsequent reductive regeneration of the $TiO_2$/Pt catalyst/sorber at 500° F.

Example 4 shows the amount of sulfur captured and released with a Tio$_2$/Pt catalyst/sorber during a 30 minute, 30 ppm SO$_2$ sorption cycle at 500° F. and a standard desorption cycle at 500° F. The results in FIG. 4 show that the amount of sulfur compounds desorbed was equivalent to the amount of SO$_2$ sorbed during the previous sorption cycle and that the desorbed gas was composed of a mixture of H$_2$S and SO$_2$.

Example 5

Example 5 shows the amount of sulfur sorbed and desorbed with a TiO$_2$/Pt/Cu sample during a 20 minute, 60 ppm SO$_2$ sorption cycle at 500° F. and a standard desorption cycle at 500° F. The results in FIG. 5 demonstrates that the amount of sulfur components desorbed was equivalent to the amount of SO$_2$ sorbed during the previous sorption cycle and that the components desorbed was primarily SO$_2$.

Example 6

Example 6 shows the effect of copper loading (metal modifier) on the proportion of sulfur released as SO$_2$ or H$_2$S during regeneration cycles of partially saturated TiO$_2$/Pt catalyst/sorber. This example shows in FIG. 6 that with 0.3 g/in$^3$ of Cu(NO$_3$)$_2$ and higher, all the sulfur is released as SO$_2$. With no Cu(NO$_3$)$_2$, 90% of the sulfur is released as H$_2$S and 10% is releases as SO$_2$. This effect was also obtained with other modifiers.

Example 7

Figure 7:
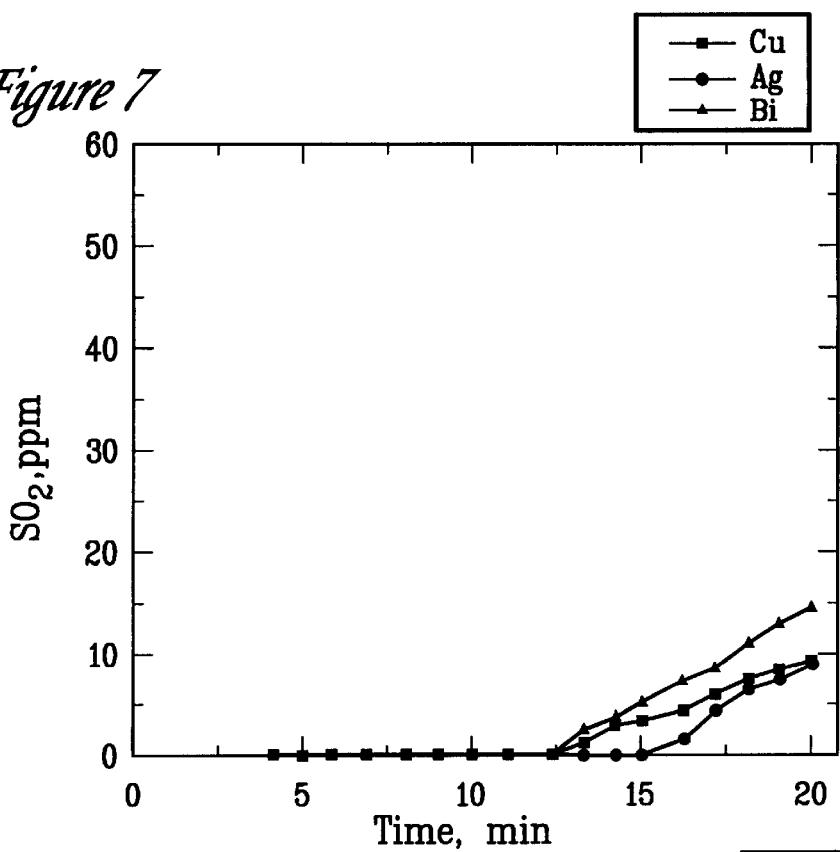
FIG. 7 shows 300° F., 60 ppm $SO_2$ sorption runs with $TiO_2$/Pt catalyst/sorbers modified with Bi, Ag or Cu.

Example 7 shows the SO$_2$ capture during 20 minute, 60 ppm sorption cycles using TiO$_2$/Pt with Cu, Ag and Bi modifiers (TiO$_2$/Pt/Cu 2.18 g/in$^3$; 1.1% Pt; 0.3 g/in$^3$ X(NO$_3$)$_x$; where X=Cu, Ag, Bi). All exhibit similar characteristics with initially 100% capture efficiency until reaching a point where SO$_2$ breakthrough begins. The amount of breakthrough then steadily increases with time as can be seen in FIG. 7.

Example 8

Figure 8:
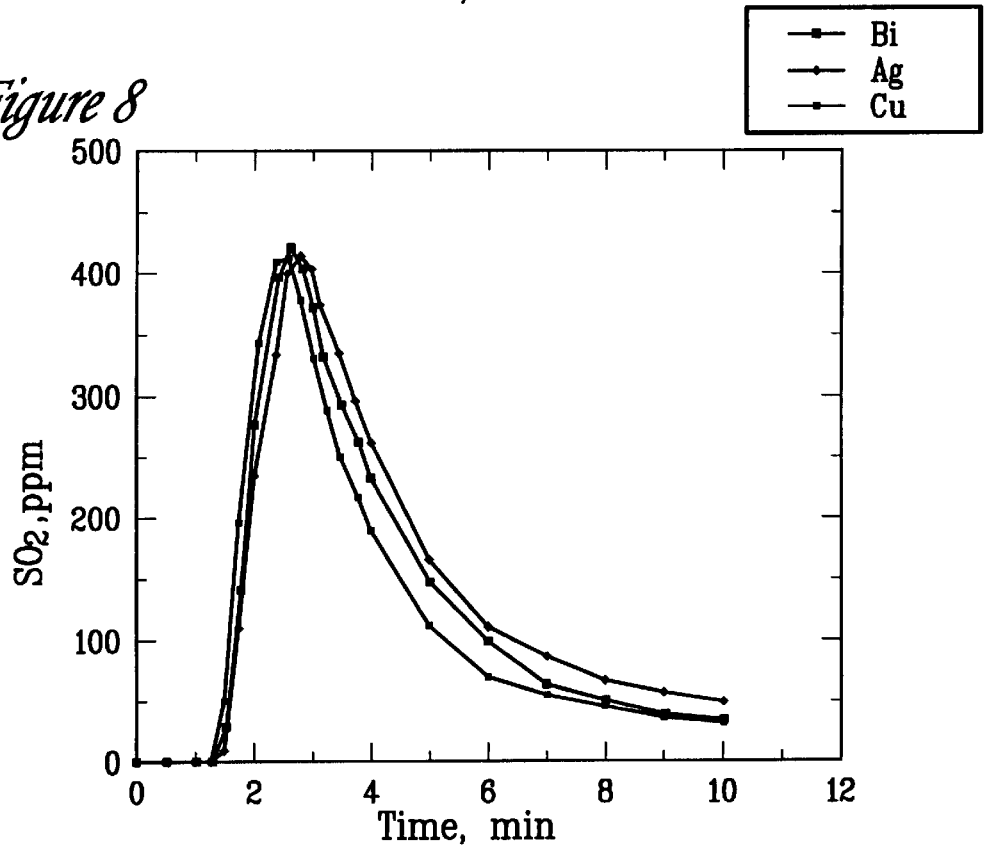
FIG. 8 shows the $SO_2$ release during regeneration of $TiO_2$/Pt catalyst/sorbers modified with Bi, Ag or Cu.

Example 8 demonstrate the SO$_2$ released during the regeneration of TiO$_2$/Pt catalyst/sorber with Bi, Ag, and Cu metal modifiers. These regenerations followed 20 minute, 30 ppm SO$_2$ sorption cycles and appear to be almost identical with liberation of SO$_2$ as shown in FIG. 8.

Example 9

Example 9 illustrates consecutive 60 ppm SO$_2$ sorption cycles with a TiO$_2$/Cu modifier/sorber (2.18 g/in$^3$ TiO$_2$; 0.3 g/in$^3$ Cu(NO$_3$)$_2$) with no noble metal component at 500° F. This result shown in FIG. 9 illustrates that the TiO$_2$/metal modifier will capture the sulfur, however, the catalyst/sorber is not regenerated during the regeneration cycle.

Example 10

Figure 10:
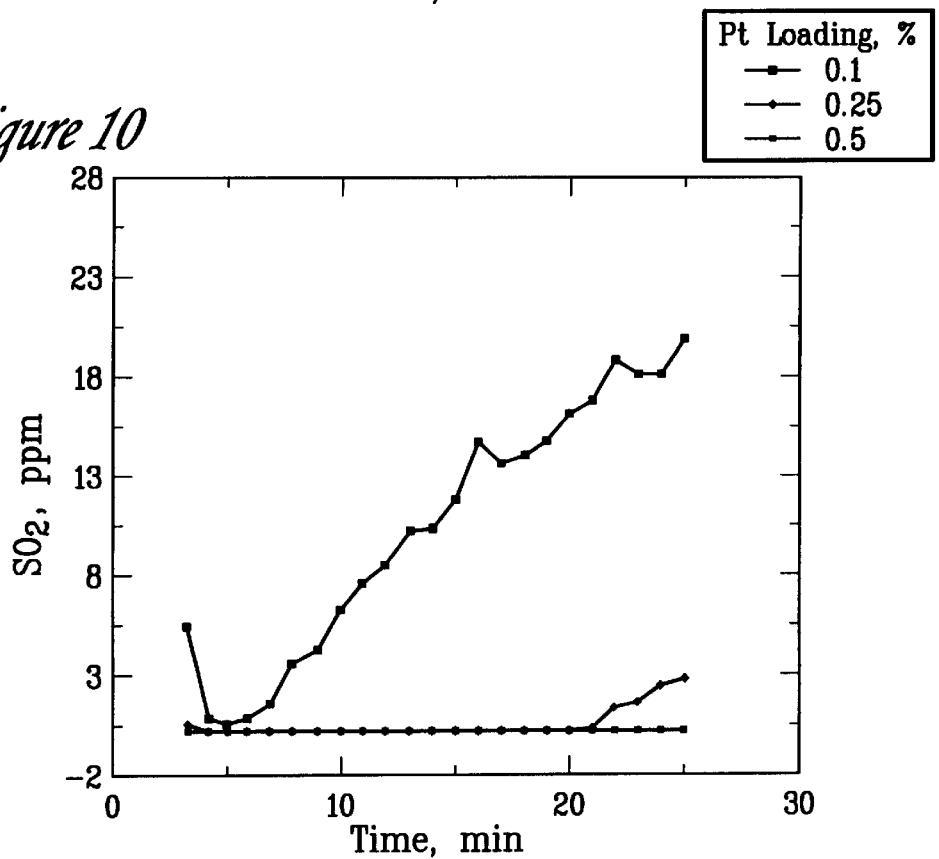
FIG. 10 shows the effect of Pt loading reported as wt % of sorber/carrier on the $SO_2$ breakthrough during 60 ppm $SO_2$ run cycles at 500° F.

Example 10 illustrates the effect of Pt loading on the SO$_2$ breakthrough during 60 ppm SO$_2$ sorption cycles with a TiO$_2$/Pt/Cu catalyst/sorber (2.18 g/in$^3$ TiO$_2$/Pt: 0.3 g/in$^3$ Cu(NO$_3$)$_2$) at 500° F. FIG. 10 shows that the efficiency of the TiO$_2$/Pt/Cu is directly related to the Pt loading, such that the higher the loading the higher the sulfur capture capacity.

Example 11

Figure 11:
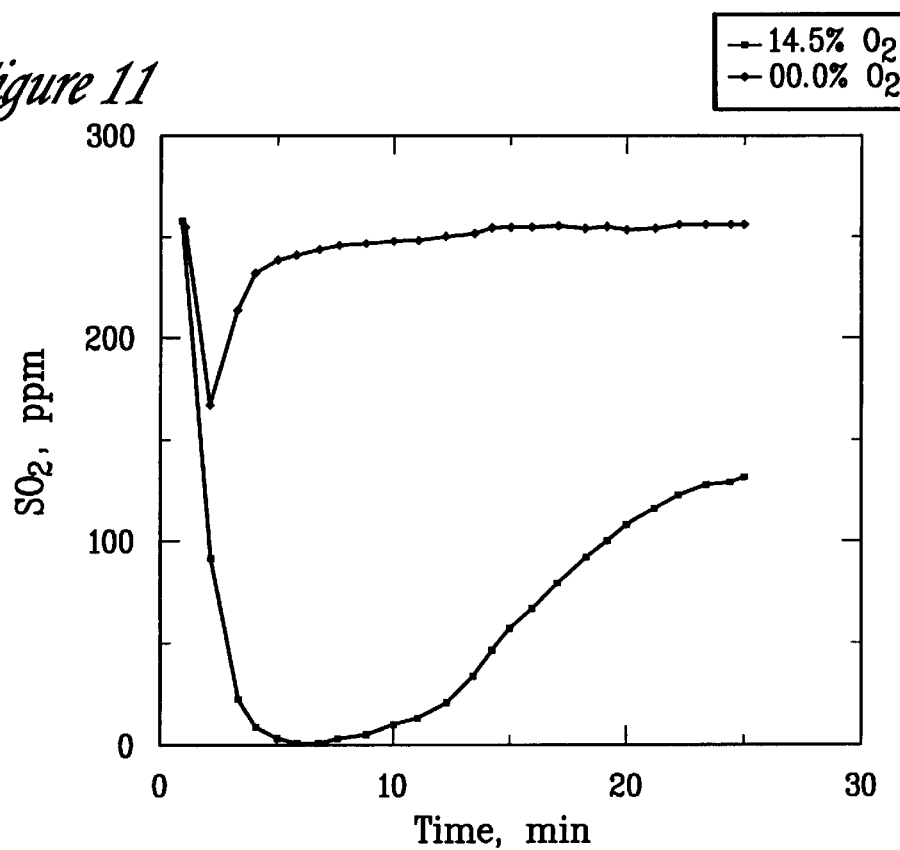
FIG. 11 shows the effect of oxygen on the $SO_2$ sorption for the $TiO_2$/Pt catalyst/sorber system.

Example 11 illustrates the effect of oxygen in the flue gas during 25 minute, 250 ppm SO$_2$ sorption cycles with a TiO$_2$/Pt/Cu catalyst sorber at 500° F. FIG. 11 shows that sorption of the sulfur components is significantly reduced in the absence of oxygen.

Example 12

Example 12 shows the sulfur removal efficiency obtained during 75 minute, 60 ppm $SO_2$ sorption runs with a $TiO_2$/Pt catalyst/sorber at various temperatures and a $TiO_2$/Pt/Cu catalyst/sorber at 620° F. is shown. FIG. 12 shows that the removal efficiency increases with temperature and that the removal efficiency is slightly decreased by the addition of the metal modifier.

Example 13

Figure 13:
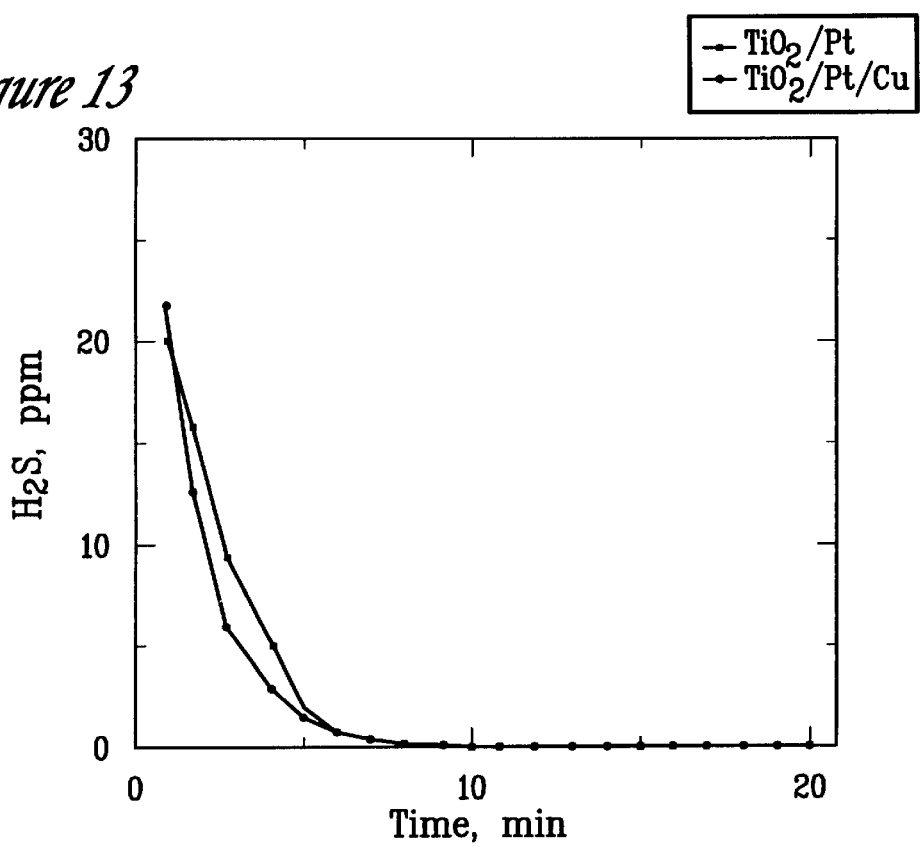
FIG. 13 shows the $H_2S$ sorption with $TiO_2$/Pt and $TiO_2$/Pt/Cu catalyst sorbers with 30 ppm inlet $H_2S$ at 500° F.

Example 13 shows that $H_2S$ is removed during sorption cycles with both the $TiO_2$/Pt and $TiO_2$/Pt/Cu catalyst/sorbers at 500° F. FIG. 13 shows the results and demonstrates that $H_2S$ is also captured by the catalyst/sorbers.

Example 14

Figure 14:
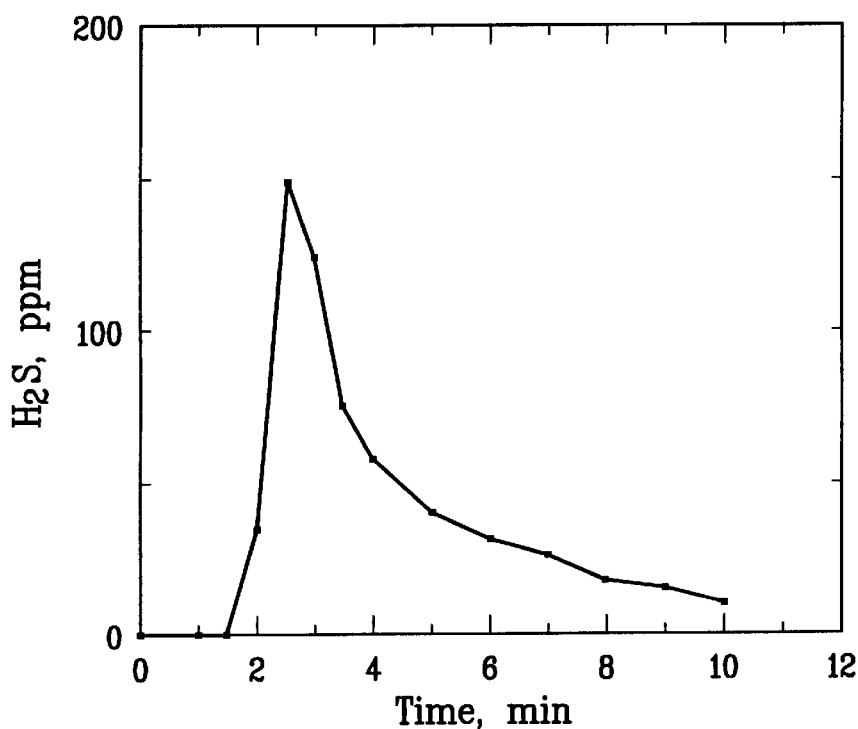
FIG. 14 shows desorption of captured $H_2S$ after the sorption run with the $TiO_2$/Pt system illustrated in FIG. 13.

Example 14 shows that sulfur is released primarily as $H_2S$ during a desorption run of a partially saturated $TiO_2$/Pt catalyst sorber at 500° F. The preceding sorption run utilized a 20 minute, 20 ppm $H_2S$ cycles at 500° F. This result, shown in FIG. 14, demonstrates that the catalyst/sorbers can be regenerated after $H_2S$ capture.

Example 15

Figure 15:
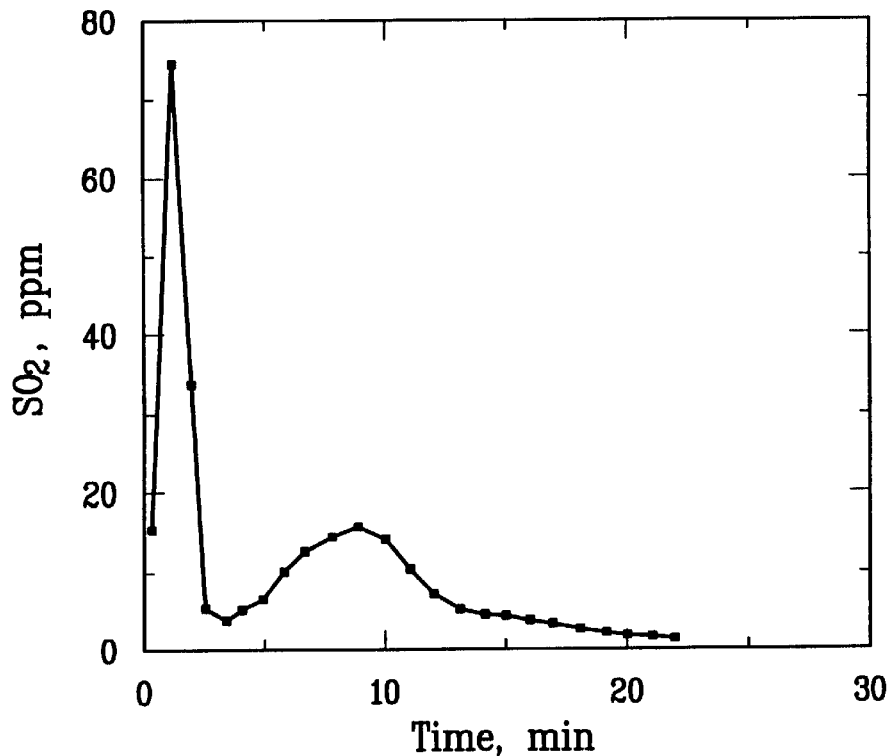
FIG. 15 shows $SO_2$ released during a 900° F. desorption with inert gas, which followed a 100 ppm $SO_2$ sorption at 500° F.

In this Temperature Programmed Desorption (TPD) experiment a 4-minute sorption cycle with 100 ppm of $SO_2$ was conducted at 300° F. (13 cc $TiO_2$/Pt 3.0 g/in$^3$ $TiO_2$:1.1% Pt), space velocity=30,000 hr$^{-1}$). After the temperature was increased to 900° F., nitrogen was then passed over the catalyst as a space velocity of 30,000 hr$^{-1}$. From the TPD experiment it was determined that all the sulfur captured during the 4 minute run cycle was released during the high temperature regeneration; however, no $H_2S$ was detected, hence all the sulfur released was in the form of $SO_2$. This illustrates that the H2S formation occurs only in the presence of the $H_2$. FIG. 15 shows that the sulfur is released in two pulses. The first being much sharper than the second.

Example 16

Figure 16:
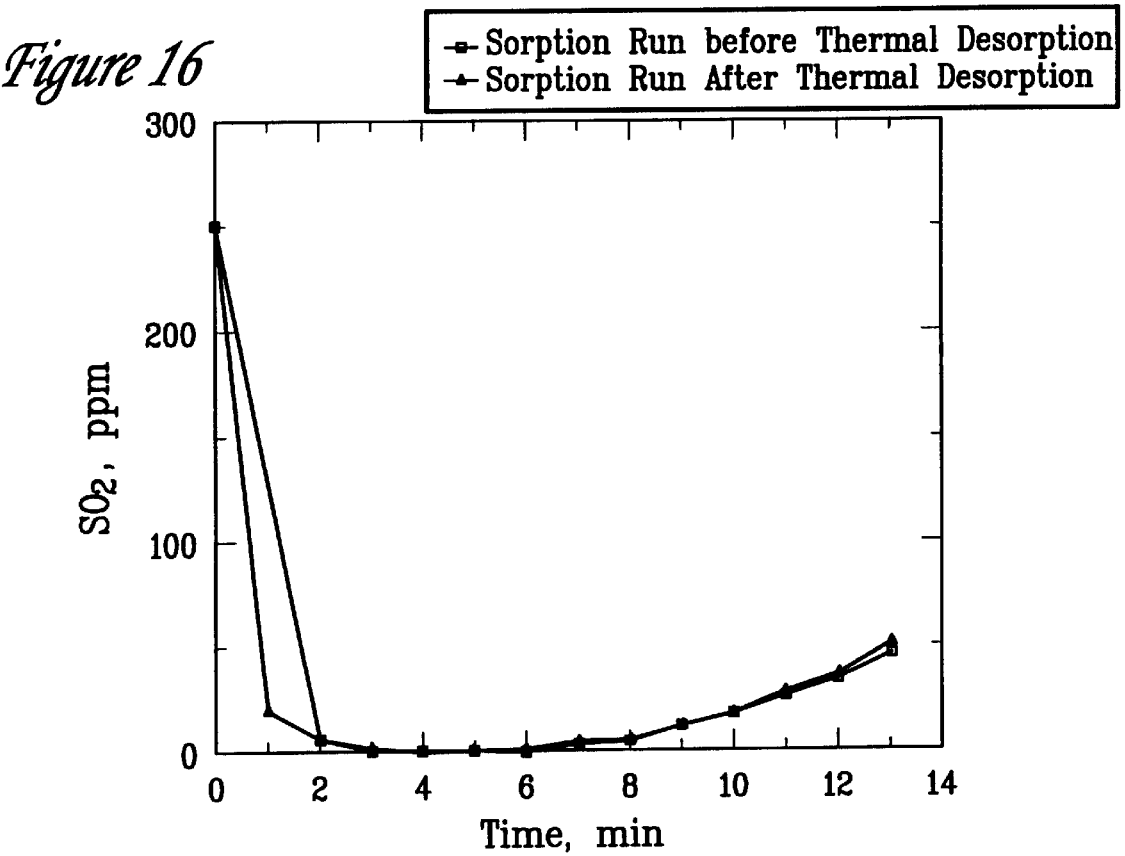
FIG. 16 shows 250 ppm $SO_2$ sorption runs following a standard regeneration and following a thermal regeneration with air.

In this Temperature Programmed Desorption (TPD) experiment a 10 minute sorption cycle with 250 ppm of $SO_2$ was conducted at 500° F. (13 cc $TiO_2$/Pt 3.0 g/in$^3$ TiO2:1.1% Pt), space velocity=20,000 hr$^{-1}$). After the temperature was increased to 900° F., air (approximately 20.9% $O_2$) was then passed over the catalyst for 10 minutes at a space velocity of 10,000 hr$^{-1}$. During the desorption no $SO_2$ or $H_2S$ was detected, however, continuous cycling showed that the $TiO_2$/Pt catalyst/sorber was revitalized during each 900° F. air regeneration. This is illustrated in FIG. 16. The regeneration gas was also bubbled through isopropanol and analyzed for sulfur. A significant amount of dissolved sulfur was found suggesting that $SO_3$ was released during regenerations.

The invention claimed is:

1. A method for removing more than 90% of $SO_2$ from an oxidizing gaseous stream containing $SO_2$ and oxygen comprising:

contacting said oxidizing gaseous stream at space velocities of 1,000 to 120,000 per hour with a catalyst/sorber composite containing an oxidation catalyst comprising Pt coated onto an oxide of Ti, said oxide being coated on a porous inert ceramic or porous metallic structure;

terminating said oxidizing gaseous stream from contacting said catalyst/sorber; and contacting said catalyst/sorber with a reducing gaseous stream at space velocities of 20 to 20,000 per hour, whereby $H_2S$ and or $SO_2$ are removed from said catalyst/sorber.

2. A method in accordance with claim 1 wherein said oxidation catalyst comprises Pt in a concentration of 0.005 to 0.08 grams per cubic inch of said inert structure.

3. A method in accordance with claim 1 wherein said catalyst/sorber includes a modifier selected from CuO, $Ag_2O$, $Bi_2O_3$ or mixtures thereof.

4. A method in accordance with claim 3 wherein said modifier has a concentration of 0.0 to 0.3 grams per cubic inch of said oxides.

5. A method in accordance with claim 3 wherein the relative proportions of $H_2S$ and $SO_2$ are adjusted by the concentration of said modifier.

6. A method in accordance with claim 1 wherein said reducing gaseous stream compries an inert component and a reducing component.

7. A method in accordance with claim 6 wherein said inert component comprises nitrogen, helium, argon, steam or mixtures thereof.

8. A method in accordance with claim 6 wherein said reducing component comprises hydrogen, $C_1$ to $C_{12}$ hydrocarbons or mixtures thereof.

9. A method in accordance with claim 1 wherein said oxidizing gaseous stream comprises combustion exhaust.

10. A method in accordance with claim 1 wherein said oxidizing gaseous stream comprises an industrial exhaust stream.

11. A method in accordance with claim 1 wherein said structure comprises a honeycomb structure.

* * * * *